Patented July 1, 1941

2,247,402

UNITED STATES PATENT OFFICE 2,247,402

ARALKYL PHENOL AND METHOD OF MAKING IT

Ralph P. Perkins and Fred Bryner, Midland, Mich., assignors to The Dow Chemical Company, Midland, Mich., a corporation of Michigan No Drawing. Application March 24, 1939, Serial No. 263,910

15 Claims. (Cl. 260—619)

This invention relates to a new method of making aralkyl phenols and to certain new substituted aralkyl phenols prepared thereby.

A small number of aralkyl phenols have heretofore been repared by reacting phenol with styrene and certain of its homologs in the presence of powerful catalysts such as sulfuric acid, aluminum chloride, and the like. This method is not altogether satisfactory, however, in that the condensation catalysts employed tend also to promote polymerization of the styrene reactant, and thereby seriously to reduce the yield of desired product. Moreover, when attempt is made to react substituted phenols with styrene and its homologs in the presence of these catalysts, further difficulties are encountered in that the catalysts tend to favor formation of by-products, and frequently to effect intramolecular rearrangement of the phenolic reactants and products.

An object of the present invention, then, is to provide a catalyst for the reaction of phenols with styrene and related compounds which avoids the reaction difficulties discussed. Another object is to devise a new method for preparing aralkyl phenols. Still another object is to employ the new method to synthesize a class of novel aralkyl phenols.

According to the invention, styrene and similar compounds, specifically 2-aryl-1-alkenes and 2-haloaryl-1-alkenes, may be reacted with a group of phenols, viz. hydroxylated aromatic hydrocarbons and mono-halo hydrocarbons, in the presence of hydrogen chloride or hydrogen bromide as catalyst, to form aralkyl phenols in good yield.

Although widely varying proportions of reactants may be employed in our process, we prefer to use approximately 0.3 to 1.0 mol of styrene compound per mol of the phenol to be reacted. According to one procedure, the phenol and a small proportion, e. g. 0.02 to 2.5 per cent by weight of the phenol, preferably 0.05 to 0.2 per cent, of hydrogen chloride or hydrogen bromide, are heated to a reaction temperature, e. g. 20° to 250° C., depending upon the reactants employed, usually 120°–150° C., and the styrene compound is added slowly with agitation. The resulting mixture is then heated for a time to insure completion of the reaction, after which it is cooled, neutralized, and fractionally distilled at reduced pressure to separate the desired aralkyl phenol. If the phenolic reactant is a solid at operating temperatures, the reactant may be conducted in an inert solvent. The hydrogen halide catalyst may be added per se, or in aqueous solution, as desired.

When aralkylation of a phenol is carried out as described, the reaction product is in most instances largely a para-substituted phenol, provided a position para to a hydroxyl group is open for substitution. When such para position is not open, the aralkyl group will enter a position ortho to a hydroxyl group. If, however, all the positions ortho and para to the hydroxyl groups are filled, reaction according to the invention has not been found possible. For that reason, the phenolic reactants in our process are limited to hydroxylated aromatic hydrocarbons and mono-halo hydrocarbons which have a hydrogen atom in one of the positions ortho and para to a hydroxyl group. Examples of such phenols are: phenol, o-cresol, p-cresol, m-ethyl phenol, thymol, p-tertiary-butyl phenol, o-chloro phenol, mono-bromo carvacrol, catechol, resorcinol, p-methyl catechol, pyrogallol, alpha naphthol, mono-chloro beta-naphthol, o-phenyl phenol, p-phenyl phenol, 4-hydroxy-2-chloro diphenyl, alpha anthrol, and the like.

The olefinic reactant in our process, as stated above, is a 2-aryl-1-alkene or a 2-halo-aryl-1-alkene, e. g. styrene, alpha-methyl styrene, alpha-ethyl styrene, o-methyl styrene, p-ethyl styrene, p-chloro styrene, o-bromo-alpha-methyl styrene, vinyl naphthalene, as. diphenyl thylene, as. di-(p-chlorophenyl) ethylene, etc. These compounds may all be reacted with any of the phenols hereinbefore enumerated to form the corresponding aralkyl phenols.

The hydrogen halide catalyst in our process is limited to hydrogen chloride or hydrogen bromide. Aqueous hydrogen fluoride is practically inoperable as a catalyst, and hydrogen iodide gives results markedly inferior to those of the invention.

It will be appreciated that an advantage of our process is that the reaction between phenol and styrene compound takes place without undue polymerization of the styrene reactant and without formation of an undesirably large proportion of by-products. However, if it is desired absolutely to avoid polymerization of the styrene compound during reaction, a polymerization inhibitor in addition to the phenolic reactant itself may be added. Our method has the further advantage that the hydrogen halide catalyst is selective. That is, it is possible to treat a phenol with a crude mixture of olefins containing a 2-aryl-1-alkene or 2-haloaryl-1-alkene, and selectively to react the latter compounds with the phenol without also effecting a reaction of the other olefins in the mixture.

The following examples will illustrate our new reaction, but are not to be construed as limiting the scope of the invention:

Example 1

A mixture of 2 mols (188 grams) of phenol, and 0.5 gram of a 36 per cent aqueous solution of hydrogen chloride was heated to a temperature of 120° to 130° C., and 1 mol (118 grams) of alpha-methyl styrene was added slowly with agitation during 0.7 hour. The mixture was then heated at 120°–130° C. for 0.5 hour more, after which it was cooled, neutralized with aqueous sodium hydroxide, and fractionally distilled at an absolute pressure of 25 millimeters of mercury. In this way there were recovered unreacted alpha-methyl styrene and phenol, and 178 grams of p-(alpha phenyl isopropyl) phenol, boiling at 212° to 220° C. at 25 millimeters pressure. The yield of this latter product was 92.3 per cent, based on the phenol which had reacted.

This experiment, when repeated using as catalyst 1 c. c. of a 52 per cent hydrobromic acid solution, gave substantially the same result.

Example 2

Styrene was reacted with phenol in the presence of 0.9 per cent of hydrogen chloride under the same conditions as in Example 1, and the product was purified in an analogous manner. There was obtained a 64.8 per cent yield of a mixture of approximately equal proportions of ortho and para (alpha phenyl ethyl) phenols.

Example 3

A mixture of 2 mols (257 grams) of ortho-chloro-phenol and 0.5 gram of a 36 per cent aqueous solution of hydrogen chloride was heated to a temperature of 145° to 150° C. and 1 mol (118 grams) of alpha-methyl styrene was added with agitation during 0.9 hour. The mixture was then heated at 140° to 165° C. for 2.5 hours more, after which it was cooled, neutralized, and fractionally distilled at a pressure of 25 millimeters of mercury, 161.5 grams of a fraction boiling at 212° to 225° C. being collected. This material, which solidified on cooling, was purified by recrystallization from cyclohexane. The purified product had a melting point of 47.5° to 48° C., and a boiling point of about 214° C. at 25 millimeters, and was found to be substantially pure p-(alpha phenyl isopropyl) o-chloro phenol.

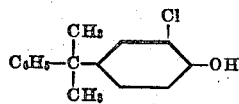

The yield was 93 per cent of theoretical, based on the chloro phenol consumed.

Example 4

A mixture of 2 mols (216 grams) of o-cresol and 5 grams of 36 per cent concentrated hydrochloric acid was charged into a reactor provided with cooling means, and 1 mol (118 grams) of alpha-methyl styrene was added slowly with agitation during 0.4 hour, the temperature being maintained at 20° to 40° C. The mixture was then allowed to stand 15 hours, after which it was fractionally distilled at a pressure of 12 millimeters, 129 grams of a fraction boiling at 196° to 200° C. being collected. This crude product was a yellow oil, which, when crystallized from cyclohexane, was obtained as colorless crystals having a freezing point of 47.2° C. and a boiling point of about 214° C. at 25 millimeters. It was found to be p-(alpha phenyl isopropyl) o-cresol

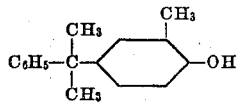

Example 5

Alpha-methyl styrene was reacted with m-cresol and with p-cresol in the presence of hydrogen chloride, according to the procedure of Example 1. With m-cresol, there was obtained an 81 per cent yield of p-(alpha phenyl isopropyl) m-cresol

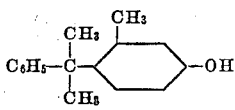

a colorless liquid having a boiling point of about 198° to 200° C. at 25 millimeters pressure. With p-cresol, there was recovered a 66.5 per cent yield of o-(alpha phenyl isopropyl) p-cresol

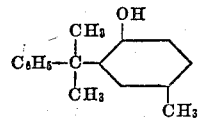

a colorless liquid having a boiling point of about 193° to 195° C. at 25 millimeters pressure. These two new compounds are insoluble in aqueous sodium hydroxide, even at elevated temperatures.

Example 6 as. Diphenyl ethylene was reacted with phenol in the presence of hydrogen chloride, according to the procedure of Example 1. There was obtained a 47 per cent yield of p-(alpha-alpha diphenyl ethyl) phenol

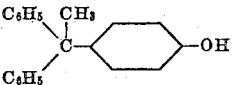

a white crystalline solid having a melting point of 121.5° to 122° C. and a boiling point of about 225° C. at 5 millimeters pressure.

Example 7

A mixture of o- and m-ethyl styrene was reacted with phenol in the presence of hydrogen chloride according to the procedure of Example 1. There was obtained a 72 per cent yield of a mixture of alpha-(ethyl phenyl) ethyl phenols having a boiling point of 182° to 210° C. at 21 millimeters pressure.

Example 8

A nuclear mono-chloro styrene (mostly para-chloro styrene) was reacted with phenol in the presence of hydrogen chloride according to the procedure of Example 1. There was obtained a 45 per cent yield of a liquid mixture of alpha (chloro phenyl) ethyl phenols, having a boiling point of 198° to 205° C. at 10 millimeters pressure.

From the foregoing, it will be evident that our invention provides a new and improved method which is generally applicable to reacting 2-aryl-1-alkenes and 2-halo-aryl-1-alkenes with hydroxylated aromatic hydrocarbons and hydroxylated mono-halo hydrocarbons having a hydrogen atom in one of the positions ortho and para to a hydroxyl group. By utilizing this process, we have been able to prepare certain new aralkyl phenols which have not heretofore been prepared by any known method for the aralkylation of phenols. Our new compounds correspond to the general formula

wherein R is hydrogen or a lower alkyl radical, and P is an ortho or para monohydroxy phenyl radical which contains a substituent selected from the class consisting of halogens and lower alkyl radicals. These new products may be prepared by reacting a 2-phenyl-1-alkene, e. g. styrene, alpha-methyl styrene, alpha-ethyl styrene, etc., with a lower alkyl or mono-halo phenol in the presence of hydrogen chloride or hydrogen bromide. Examples of our new compounds are ortho- and para-(alpha phenyl ethyl)-o-cresol, para-(alpha phenyl isopropyl)-o-cresol (Example 4), para-(alpha phenyl isopropyl)-m-cresol (Example 5), ortho-(alpha phenyl isopropyl)-p-cresol (Example 5), para-(alpha phenyl isopropyl)-o-chloro phenol (Example 3), ortho-(alpha phenyl secondary butyl)-para ethyl phenol, 4-(alpha phenyl ethyl)-2-bromo-6-methyl phenol, and the like. These compounds are useful in germicides and fungicides, and as intermediates in the manufacture of synthetic resins and insecticides.

Other modes of applying the principle of the invention may be employed instead of those explained, change being made as regards the details disclosed, provided the product or method stated in any of the following claims or the equivalent of such stated product or method be obtained or employed.

We claim:
1. The method of making an aralkyl phenol which comprises reacting a compound selected from the class consisting of 2-aryl-1-alkenes and 2-haloaryl-1-alkenes with a phenol having a hydrogen atom in one of the positions ortho and para to a hydroxyl group and selected from the class consisting of hydroxylated aromatic hydrocarbons and hydroxlated mono-halo-aromatic hydrocarbons in the presence of a hydrogen halide selected from the class consisting of hydrogen chloride and hydrogen bromide.

2. The method of making an aralkyl phenol which comprises reacting a compound selected from the class consisting of 2-aryl-1-alkenes and 2-halo-aryl-1-alkenes with a phenol having a hydrogen atom in one of the positions ortho and para to a hydroxyl group and selected from the class consisting of hydroxylated aromatic hydrocarbons and hydroxylated mono-halo-aromatic hydrocarbons in the presence of a small proportion of a hydrogen halide selected from the class consisting of hydrogen chloride and hydrogen bromide.

3. The method of making an aralkyl phenol which comprises reacting a compound selected from the class consisting of 2-aryl-1-alkenes and 2-haloaryl-1-alkenes with a phenol having a hydrogen atom in one of the positions ortho and para to a hydroxyl group and selected from the class consisting of hydroxylated aromatic hydrocarbons and hydroxylated mono-halo-aromatic hydrocarbons in the presence of between about 0.02 and about 2.5 parts by weight of a hydrogen halide selected from the class consisting of hydrogen chloride and hydrogen bromide per 100 parts of said phenol.

4. The method of making an aralkyl phenol which comprises reacting a 2-aryl-1-alkene with a mononuclear phenol having a hydrogen atom in one of the positions ortho and para to a hydroxyl group and selected from the class consisting of hydroxlated aromatic hydrocarbons and hydroxylated mono-halo-aromatic hydrocarbons in the presence of between about 0.02 and about 2.5 parts by weight of a hydrogen halide selected from the class consisting of hydrogen chloride and hydrogen bromide per 100 parts of said phenol.

5. The method of making an aralkyl phenol which comprises reacting a 2-phenyl-1-alkene with a mononuclear phenol having a hydrogen atom in one of the positions ortho and para to a hydroxyl group and selected from the class consisting of hydroxlated aromatic hydrocarbons and hydroxylated mono-halo-aromatic hydrocarbons in the presence of between about 0.02 and about 2.5 parts by weight of a hydrogen halide selected from the class consisting of hydrogen chloride and hydrogen bromide per 100 parts of said phenol.

6. The method of making an (alpha phenyl isopropyl) phenol which comprises reacting alpha-methyl styrene with a mononuclear phenol having a hydrogen atom in one of the positions ortho and para to a hydroxyl group and selected from the class consisting of hydroxylated aromatic hydrocarbons and hydroxylated mono-halo-aromatic hydrocarbons in the presence of between about 0.02 and about 2.5 parts by weight of a hydrogen halide selected from the class consisting of hydrogen chloride and hydrogen bromide per 100 parts of said phenol.

7. The method of making an aralkyl phenol which comprises reacting a compound selected from the class consisting of 2-aryl-1-alkenes and 2-haloaryl-1-alkenes with a phenol having a hydrogen atom in one of the positions ortho and para to a hydroxyl group and selected from the class consisting of hydroxylated aromatic hydrocarbons and hydroxylated mono-halo-aromatic hydrocarbons in the presence of between about 0.02 and about 2.5 parts by weight of a hydrogen halide selected from the class consisting of hydrogen chloride and hydrogen bromide per 100 parts of said phenol, and at a temperature between about 20° C. and about 250° C.

8. The method of making an aralkyl phenol which comprises reacting a compound selected from the class consisting of 2-aryl-1-alkenes and 2-haloaryl-1-alkenes with a phenol having a hydrogen atom in one of the positions ortho and para to a hydroxyl group and selected from the class consisting of hydroxylated aromatic hydrocarbons and hydroxylated mono-halo-aromatic hydrocarbons in the presence of between about 0.05 and about 0.2 parts by weight of a hydrogen halide selected from the class consisting of hydrogen chloride and hydrogen bromide per 100 parts of said phenol, and at a temperature between about 120° C. and about 150° C.

9. The method of making an aralkyl phenol which comprises reacting a 2-phenyl-1-alkene with a mononuclear phenol having a hydrogen atom in one of the positions ortho and para to a hydroxyl group and selected from the class consisting of hydroxylated aromatic hydrocarbons and hydroxylated mono-halo-aromatic hydrocarbons in the presence of between about 0.05 and about 0.2 parts by weight of a hydrogen halide selected from the class consisting of hydrogen chloride and hydrogen bromide per 100 parts of said phenol, and at a temperature between about 120° C. and about 150° C.

10. An aralkyl phenol corresponding to the general formula

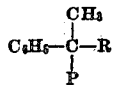

wherein R is a lower alkyl radical, and P is a monohydroxy phenyl radical selected from the group consisting of ortho and para monohydroxy phenyl radicals which contain a substituent selected from the group consisting of halogen and lower alkyl radicals.

11. An aralkyl phenol corresponding to the general formula

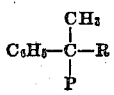

wherein R is a lower alkyl radical, and P is a monohydroxy phenyl radical selected from the class consisting of ortho and para monohydroxy phenyl radicals which contain a lower alkyl substituent.

12. An aralkyl phenol corresponding to the general formula

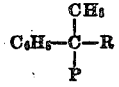

wherein R is a lower alkyl radical, and P is a monohydroxy phenyl radical selected from the class consisting of ortho and para monohydroxy phenyl radicals which contain a single halogen substituent.

13. Para-(alpha phenyl isopropyl)-orthocresol.
14. Para-(alpha phenyl isopropyl)-meta-cresol.
15. Para-(alpha phenyl isopropyl-ortho chlorophenol.

RALPH P. PERKINS.
FRED BRYNER.